US007146237B2

(12) United States Patent
Lev-Ami et al.

(10) Patent No.: US 7,146,237 B2
(45) Date of Patent: Dec. 5, 2006

(54) CONTROLLER AND METHOD TO MEDIATE DATA COLLECTION FROM SMART SENSORS FOR FAB APPLICATIONS

(75) Inventors: Uzi Lev-Ami, Mountain View, CA (US); Guenter Sifnatsch, Santa Clara, CA (US); Mark Attwood, Morgan Hill, CA (US)

(73) Assignee: MKS Instruments, Inc., Andover, MA (US)

( * ) Notice: Subject to any disclaimer, the term of this patent is extended or adjusted under 35 U.S.C. 154(b) by 25 days.

(21) Appl. No.: 10/819,903

(22) Filed: Apr. 7, 2004

(65) Prior Publication Data

US 2005/0228529 A1    Oct. 13, 2005

(51) Int. Cl.
*G06F 19/00* (2006.01)
(52) U.S. Cl. ...................................... 700/121
(58) Field of Classification Search ............ 700/28–32, 700/52, 108–111, 117–121
See application file for complete search history.

(56) References Cited

U.S. PATENT DOCUMENTS

| 4,736,367 A | * | 4/1988 | Wroblewski et al. ...... 340/3.51 |
| 5,469,150 A | * | 11/1995 | Sitte .......................... 340/3.42 |
| 5,978,753 A | * | 11/1999 | Eidson ....................... 702/188 |
| 6,002,996 A | * | 12/1999 | Burks et al. ................ 702/188 |
| 6,237,112 B1 | * | 5/2001 | Yoo et al. ...................... 714/30 |
| 6,609,076 B1 | * | 8/2003 | Schuh et al. .................. 702/99 |
| 6,801,878 B1 | * | 10/2004 | Hintz et al. ................. 702/188 |
| 6,834,211 B1 | * | 12/2004 | Coss et al. ................... 700/108 |
| 6,889,165 B1 | * | 5/2005 | Lind et al. ................... 702/183 |
| 6,895,572 B1 | * | 5/2005 | Miyata et al. .............. 717/100 |
| 2003/0033032 A1 | * | 2/2003 | Lind et al. ..................... 700/52 |

\* cited by examiner

*Primary Examiner*—Maria N. Von Buhr
(74) *Attorney, Agent, or Firm*—Ernest J. Beffel, Jr.; Haynes Beffel & Wolfeld LLP

(57) ABSTRACT

The present invention relates to control of and data collection from sensors associated with tools. In particular, it relates to using a controller to mediate communications among a tool, sensors associated with the tool and data users, such as a host system or distributed processors. Particular aspects of the present invention are described in the claims, specification and drawings.

50 Claims, 6 Drawing Sheets

```
< ControlSequence >
  < Seq Time= "DateTime"
    Name= "ControlSequenceName"
    ChPos= "ChamberPosition"
    LotName= "LotName"
    WaferNo= "WaferNo"
    RecipeName= "RecipeName"
    RecipeStep= "RecipeStep" >
< /ControlSequence >
```

CONTROLLER AND METHOD TO MEDIATE DATA COLLECTION FROM SMART SENSORS FOR FAB APPLICATIONS

RELATED APPLICATIONS

This application is related to the commonly owned pending U.S. Patent Application by Uzi Lev-Ami and Yossef Ilan Reich, "Method and Apparatus for Monitoring Host to Tool Communications," application Ser. No. 09/935,213, filed on 22 Aug. 2001. That co-pending application is incorporated by reference as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to control of and data collection from sensors associated with tools. In particular, it relates to using a controller to mediate communications among a tool, sensors associated with the tool and data users, such as a host system or distributed processors.

Moore's law promises exponential growth in computer power at diminishing prices. This dynamic growth of processing power might lead one to think that semiconductor device manufacturing would be an adventuresome business, like wild-catting for oil. Just the opposite is true. Because manufacturing batches are very valuable and manufacturing processes are sensitive to even small mistakes, semiconductor device manufacturing is a conservative business. Qualification cycles and standards for new equipment and modifications of old equipment are lengthy and demanding. Even a small change is vetted extensively, before being released to production.

Key components used by a fab in semiconductor manufacturing include tools (e.g., deposition chambers, reactors), sensors that monitor the tools (e.g., FTIR sensors, mass spectrographs, thermocouples) and hosts or distributed processors that store and analyze data from the sensors regarding tool operation.

A prior application described a transparent method of listening to data from the sensors and providing it to the hosts or distributed processors using high speed and error-resistant technologies such as TCP/IP over Ethernet. The prior application was by inventors Uzi Lev-Ami and Yossef Ilan Reich, "Method and Apparatus for Monitoring Host to Tool Communications," application Ser. No. 09/935,213, filed on 22 Aug. 2001, which is incorporated by reference. The pending prior application describes a listening post that could eavesdrop on serial communications from a tool or sensor using an optically isolated connector. Using the eavesdropping approach, one could prove that the fab communications and data collection infrastructure could be upgraded without requiring modification of tools or sensors, at a low risk. The upgrade feasibility could be demonstrated without dismantling the incumbent communications infrastructure.

The next revolution in fab instrumentation and backend analysis capabilities will involve adding intelligent controllers to mediate communications between the tools and sensors, on one side of the controllers, and tool hosts or distributed processors, on the other side, without needing to replace or change the analytical characteristics of the sensors. Increased processor power and decreased storage cost create opportunities for configurations that would not previously have been practical in a fab environment. An opportunity arises to change the model of communications among tools, sensors and tool hosts, to introduce controllers and take advantage of distributed processing and storage in this failure-intolerant environment. Better, more easily configured and controlled, more resilient and transparent components and systems may result.

SUMMARY OF THE INVENTION

The present invention relates to control of and data collection from sensors associated with tools. In particular, it relates to using a controller to mediate communications among a tool, sensors associated with the tool and data users, such as a host system or distributed processors. Particular aspects of the present invention are described in the claims, specification and drawings.

DETAILED DESCRIPTION

Figure 1:
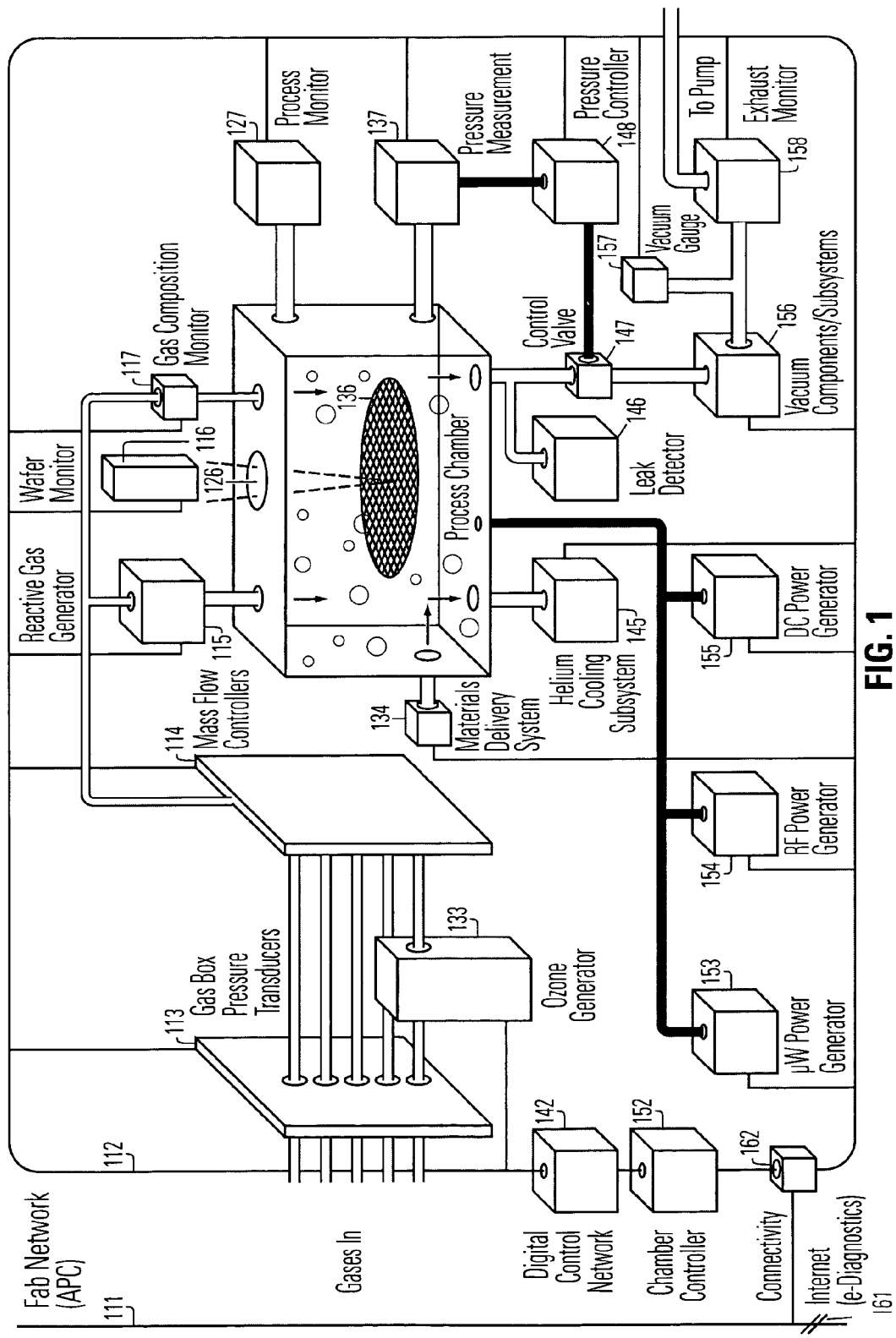
FIG. 1 illustrates an environment in which aspects of the present invention are particularly useful.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Introduction

The SECS message protocols, communication infrastructure and hosting modes used by tools and other automated or semi-automated equipment in semi conductor fabs and foundries developed years ago, when communication and processor speeds were relatively limited. SECS message protocols for fab applications were designed to utilize low-speed, serial communications. These message protocols included structured messages, which could be transmitted quickly even with low-speed communications. Structured messages were and remain difficult to translate and understand. The difficulty is exacerbated when a first message sets a context for a response and a second, responsive message does not repeat the context; that is, the context-sensitive response is only meaningful when paired with the corresponding context-setting message. Communications typically were through RS 232 or equivalent serial communications, along dedicated channels, similar to modems and phone lines for terminals and time sharing computers. Host systems ran on main frames, mini computers or work stations. Host systems typically were monolithic, controlling and monitoring all or a substantial set of tools in a fab. Host systems relied on adapters to interface with tools and sensors. Host systems typically received data from the tools and sensors and issued control instructions to the tools. Host systems often received and generated a significant volume of serial communication messages.

The term tool host is used in a broad sense to include both tool control hosts and more limited or flexible distributed processors. Tool hosts include both hosts with comprehensive, integrated tool control functions and hosts that run on distributed processors with more limited, task-specific functions. Tool hosts include products such as Consilium's FAB300 ™ software, which is described as providing a single comprehensive factory management system driven by a centralized definition of customer-specific business processes. This category of tool hosts is designed to replace traditional manufacturing execution systems, which are designed to control tools provided by different vendors. At the opposite end of the tool host spectrum from traditional manufacturing execution systems, component processes may be run on distributed processors to handle a variety of specific functions, without claiming to be comprehensive management systems. Along the spectrum, a product such as Consilium's FAB300 ™ software may be considered a tool control host for some purposes and a process running on a distributed processor, for other purposes.

In the application cited above, a removable listening device was described that could monitor a wired communications channel between one or more tool hosts and one or more tools. The listening device was passive. It optionally could include a standard isolation device to protect the communications channel from noise generated by the listening device. This isolation device could include an optical isolator, a high impedance amplifier or any other components that effectively isolate the wired communications channel from the listening device. The wired communications channel may be an RS 232, RS 422 or CAN-compliant channel, or it may be any of the communications channels previously mentioned.

Controllers and Smart Sensors

The approach disclosed herein uses intelligent controllers and smart, context-aware sensors. An intelligent controller is aware of the status of the tool and/or the workpieces (e.g., wafers or reticles) that the tool is processing. These types of controllers communicate with smart sensors that react to tool and workpiece status information. Instead of depending on reconfiguration instructions as tool and workpiece status changes, the sensors listen for and respond to status changes. They react to the status changes in pre-programmed ways, instead of requiring reconfiguration instructions.

The new intelligent controllers change the operational model for tools, sensors, controllers and data users. Controllers are aware of tool and workpiece status, one way or another. A controller may eavesdrop on or relay instructions that control a tool. Alternatively, the tool may publish its status to the controller. Or, the controller may inquire about the tool's status, either periodically or in response to events that it recognizes as requiring further inquiries. Controllers communicate status information to sensors. The status information may relate to the tool or the workpiece. The sensors are preconfigured to respond to the status information. In response to the status information, the sensors may adopt a data collection plan, calibrate themselves, set an output range, or associate data with the current status information. The controllers communicate data collected from the sensors to data users. The data user may be a traditional tool host running on a mainframe or may be newer software running on distributed processors. The data user may be a monolithic system or confederated packages operating independently or cooperatively. The controllers also may monitor data from the sensors, identify events of interest, and request further data already collected or change the collection plan for the sensors, responsive to the monitored data.

One Operating Environment

FIG. 1 illustrates an environment in which aspects of the present invention are particularly useful. This illustrates a process chamber 125, a variety of inputs to and outputs from the process chamber, plus sensors, control channels and controllers. The chamber 125 may be used for a variety of reactions, such as deposition, cleaning, etching, implantation, ashing, etc. Other types of tools, not illustrated by this figure, also may benefit from aspects of the present invention.

A fab network 111, potentially accessible via the internet, a virtual private network or a wide area network 112 has controlled access through a controller, firewall or other connector 162 to a tool network 112. The tool network in this figure is shown to connect the controls and sensors that impact the process chamber 125 to a ring. Those of skill in the art will understand that this architecture is merely illustrative; serial communications, Ethernet or tiered communications are more likely to be used in a fab than a ring.

Gaseous inputs to the reaction chamber 125 include gases that pass through gas box pressure transducers 113 and mass flow controllers (MFCs) 114. Some gas may pass through an ozone generator 133. Other gases and gas mixtures may pas through a reactive gas generator 115 and a gas composition monitor 117. The reactive gas generator 115 may generate plasma, either inside the process chamber 125 or outside it. The gas composition monitor 117 may be in series with or parallel to the reactive gas generator. The mass flow controllers 114 are in gaseous communication with the reactive gas generator 115 and gas composition monitor 117, and ultimately or directly in gaseous communication with the process chamber 125. The gaseous input devices 113, 114, 133, 115 and 117 are in communication with one or more digital controllers 142, chamber controllers 152 and connectivity points 162. This communication typical includes both control and telemetry. These devices may include both controls and sensors that respond to either the operation of the devices or gaseous input and/or output.

Other inputs may include materials delivery 134, a cooling subsystem 145 and various power injectors 153, 154 and 155. The reaction chamber 125 may be a deposition chamber, etcher, thermal processor or other type of reactor. Depending on the type of reaction chamber, the materials delivery system 134 may supply, for instance, materials for deposition on a workpiece 136. The cooling subsystem 145 may help regulate the temperature within the chamber 125, as most chemical reactions will proceed at rates that are temperature sensitive. Power supplied to the chamber may include micro-Watt power 153, RF power 154 used to generate plasma, and DC power 155 used to generate plasma and to heat the chamber or gases or other materials supplied to the chamber. The other inputs, like the gaseous inputs, are in communication with one or more digital controllers 142, chamber controllers 152 and connectivity points 162. This communication typical includes both control and telemetry. These devices may include both controls and sensors that respond to either controlling the operation of the devices or sensing their input and/or output.

Sensors may either respond to the chamber conditions or act on exhaust from the chamber. Sensors that respond to chamber conditions may include a wafer monitor 116 that looks through a window 126 into the chamber 125 to look at film thickness, patterns and other properties (e.g., EPI-Online™), a process monitor 127 such an optical emission monitor with an interference filter or interferometer, for etch process control, and a pressure transducer 137. Sensors that act on exhaust from the chamber 125 include a leak detector 146, a vacuum gauge 157 and an exhaust monitor 158. These sensors may interact with a pressure controller 148 and control valve 147, and with vacuum components and/or subsystems 156. They also may interact with a pump and/or an exhaust gas scrubber, which do not appear in the figure. These sensors are in communication with one or more digital controllers 142, chamber controllers 152 and connectivity points 162. This communication typical includes both control and telemetry. The devices in communication with the sensors, e.g., 147, 148 and 156, may include both controls and sensors.

Smart Sensor Examples

Of particular interest is the interaction between smart sensors and a controller. One approach to smart sensors is to add intelligence to an incumbent sensor using a device such as SenseLink ™ by MKS Instruments, Inc. SenseLink is a secure web server, gateway and data monitor in one device. SenseLink connects existing sensors, instruments and subsystems to tool side protocol, using an open and flexible XML based interface. Through SenseLink's web-based interface, the user can remotely monitor, log, control, and share real-time process information from connected equipment via a TCP/IP network. In addition, this data can be readily integrated into existing fab and data collection environments through SenseLink's XML based protocol to enable APC (advanced process control) and e-diagnostics.

SenseLink helps meet the need of fault detection and classification (FDC) and APC programs for greater amounts of data than in the past. Mining data from the sensors, instruments and subsystems which is not already transmitted through the tool's SECS port is hampered by the overwhelming amount of data that is available, the variety sensor protocols and the fact that SECS data is not framed in context of the tool's operation, such as recipe name, lot ID, chamber and wafer number. SenseLink converts proprietary sensor protocols to the tool side protocol, an open and flexible XML based interface. By converting the protocols into standards such as XML and HTTP, the data can more easily be integrated into existing data collection environments.

Multiple SenseLinks can be combined with a controller such as MKS' Blue Box Communications Manager, to allow the user to collect data from all the desired data sources on the tool and correlate this data with important parameters such as wafer number and lot ID. In addition, SenseLink can also perform additional data reduction or feature extraction to limit the amount of data that is sent to the fab network. The web-based user interface enables the user to access and configure the SenseLink easily and remotely. A real-time charting software feature of SenseLink provides basic diagnostic capabilities.

In one embodiment, a SenseLink device may include a 32-bit RISC Power PC, 50 MHz CPU, 8 MB or more flash ROM, 32 MB or more SDRAM memory and a lithium battery-backed real time clock. Communications capabilities may include 10/100/1000 BaseT, RJ45 connector with EMI filter and LED indicators, an RS232 Port CD, TXD, RXD, RTS, CTS signals and DB9 connector, a RS232/RS422 protocol selector, selectable between RS232 (TXD, RXD) and RS422 (4-wire), a CANopen Port Up to 500 Kbps, DB9 connector, and a DeviceNet Port 125 Kbps, 250 Kbps, 500 Kbps, using a 5-pin micro connector.

Figure 8:
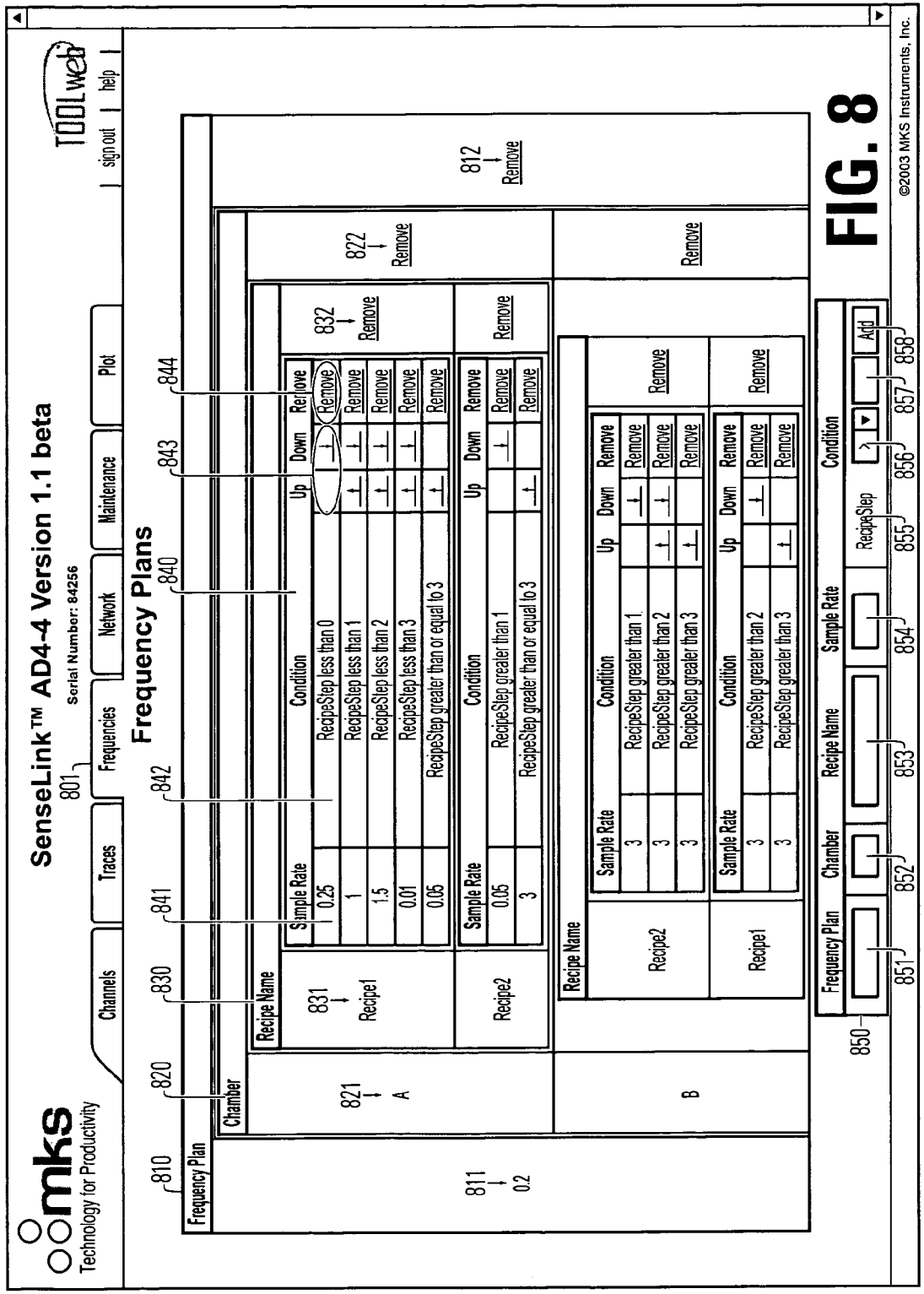
FIG. 8 illustrates a user interface for configuring SenseLink and an attached sensor to be responsive to the present context of operation of a tool and/or workpiece.

FIG. 8 illustrates a user interface for configuring SenseLink and an attached sensor to be responsive to the present context of operation of a tool and/or workpiece. It will be recognized that many different interfaces could be used to set conditions to configure a sensor, including table driven, data based, API and programmatic interfaces. In a table driven interface, any method of creating a table could be used. Values in the table would be used to set conditions, similar to the operation of LINUX. In a data based interface, data tables, not necessarily in clear text, would be used. The tables might be maintained by a data manager such as mySQL. An API interface would allow a user to set conditions by making program or function calls to software. A programmatic interface would supply a programming language for compiling conditions. In FIG. 8, the frequency plan panel has been selected via a tab 801. For the selected tool, the frequency plan frame 810 holds one or more chamber frames 820, which hold one or more recipe frames 830. The recipe frames hold condition frames 840 which include rows of conditions. At each level, a name is applied to a frame 811, 821, 831. The contents of a row or frame may be removed by selecting a remove link 842, 832, 822, 812. The rows of conditions are responsive to context information. In frame 840, there are columns to express a sampling rate that applies to a particular condition, including sample rate 841, condition 842, and up/down 843. In this embodiment, the first condition 842 that is true determines the sample rate 841 applied. Accordingly, conditions are moved up or down 843 in the list to construct an IF-THEN-ELSE or CASE type logical structure. The ordered conditions "RecipeStep less than 0" followed by "RecipeStep less than 1" logically renders the second condition in this organization "RecipeStep less than 1 AND RecipeStep greater than or equal to 0". In frame 850, frames and conditions can be added. A new frequency plan 810 can be named 851 and added 858. An existing frequency plan can be identified 851 and a new chamber 821 named 852. A new recipe 831 also can be named 853 and applied to a specific recipe in a specific chamber. Logically, a frequency plan 811, a chamber 821 and a recipe 831 could all be added 858 in a single step. Logically, recipe names applied to different chambers could apply to the same tool context when they have the same name, such as Recipe1 or Recipe2. Conditions are added to a recipe/chamber/frequency plan in this embodiment using the sample rate 854, context variable name 855, condition 856 and value 857 fields of frame 850. While this example uses only the context variable "RecipeStep" in condition building, other variables could easily be used. For instance, any of the context variables illustrated in FIG. 7 could be used. Other ways of building conditions also could be used. Here, the RecipeName is implicitly used to build a condition, "RecipeName=<string>", requiring a match between the RecipeName context and the string 831 in the recipe name frame 830. Similar conditions could be keyed to the names 821, 811 of the chamber 820 and frequency plan 810.

To generalize the SenseLink embodiment of FIG. 8, a smart sensor can be programmed to adapt to context information received from a controller. The context information preferably is human readable and symbolic, such as a recipe name, recipe step, wafer batch name, or wafer number. Special names may be assigned to wafer batches to indicate processing of a dummy batch. Ordinal values of wafers, such as the first wafer (or second or third, also experiencing a "first wafer effect") can be recognized and used as context information to which the smart sensor is responsive.

To further generalize, more than just a frequency plan can be adopted by a smart sensor, responsive to context information received from the controller. Data reduction could be responsive to context information, as the sensor may collect more data than it publishes and may store the data in order to respond to follow-up inquiries. In this configuration, a smart sensor could store an hour, day or week of data in memory and reuse the oldest data bins when the available memory was filled or when a volume, time or other parameter limit was reached. Sensor calibration also could be responsive to context information, as many sensors integrate events over time and need to adopt a dynamic range or scaling factor that avoids or minimizes problems with collector or counter saturation. For instance, photon collectors such as CCD collectors need to cycle and refresh after an appropriate time, long enough not to be noise prone and short enough to avoid saturation. Or, a spectrographic array might be focused on collecting a weak signal in one band range and accept saturation in other band ranges. Initiation of sensor calibration could be responsive to context information, for instance when a specially named batch or recipe runs with dummy wafers or an empty chamber. In certain contexts, sensors may monitor their own health to develop trust in the sensor and data produced by the sensor. Monitoring health may include, for example determining that the sensor is operating is within normally expected ranges and design parameters.

Sensors that would benefit from smart capabilities include an RGA sensor, an FTIR sensor and a particle counter. An RGA sensor, such as the MKS Instruments MicroVision Plus residual gas analysis mass spectrometer, could benefit from context information thaw would cause the RGA to run its auto-zero self calibration procedure. In one embodiment, the controller evaluates context information and uses a special message to signal that a clean recipe is operating in step 1. Preferably, logic and resources would be added to the RGA to interpret the recipe name and step number directly and respond by initiating self calibration, instead of depending on the controller to interpret the context information and send a special message. An FTIR sensor, such as the MKS Instruments MultiGas sensor Fourier transform infrared spectrometer, also could benefit from smart capabilities. For instance, an FTIR sensor could similarly be configured with resources and logic to recognize when it should begin calibration. For instance, a special recipe with a non-reactive trace gas to enable FTIR calibration. A particle counting sensor, such as the Pacific Scientific Instruments Model PM-250E/PM-255E Particle Controllers, could reset its particle counters and/or data buffers based on context information received from a controller. Other sensors also may benefit from smart capabilities. For state sensitive process sensing, including virtually all spectroscopic analyses, knowledge of the current context or processing state will significantly impact the analytical performance, by focusing the both sensing and analysis.

Controller Deployment and Architecture

Figure 2:
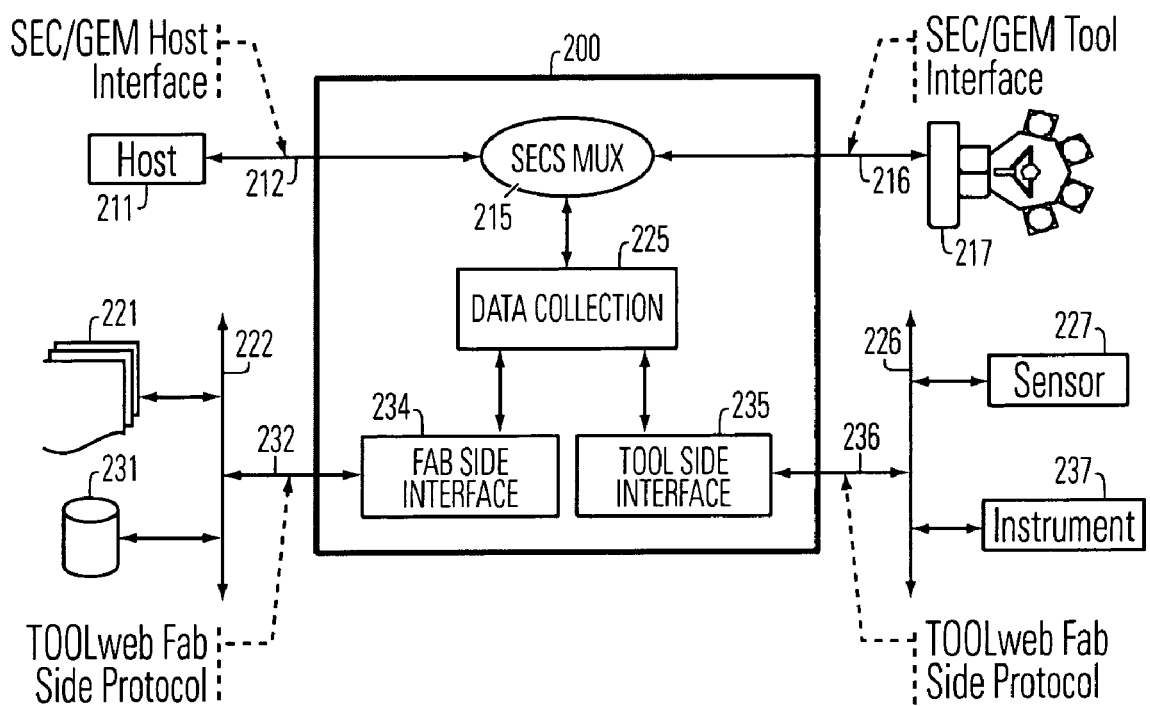
FIG. 2 is a block diagram of a controller in communication with tools, sensors, and a tool host.

FIG. 2 is a block diagram of a controller in communication with tools, sensors, and a tool host. This controller 200 configuration includes two SEC/GEM interface ports 212, 216 and two network interface ports 232, 236. The controller includes logic and resources to communicate via the SECS protocol, including a SECS MUX 215. It further includes logic and resources implementing a fab side interface 234 for communicating with data users and a tool side interface 235 for communicating with tools, sensors and instruments. The SECS MUX 215 and interfaces 234, 235 are logically connected to data collection and publishing resources 225. On the fab side of the controller, a traditional tool host 211 may be connected 212 via a SECS compliant communications channel, either SECS-I, HSMS or a subsequent revision of or successor to SECS. In a non-fab environment where this invention might be applied, other protocols could be used to connect with a tool that is being monitored, such as a medical tool or a numerically controlled machine tool. It also may be connected via a fab side protocol distinct from SECS that is carried by a network 222 to storage 231 and reporting 221 resources. On the tool and sensor side of the controller 200, a SEC/GEM tool interface 217 to a tool or tool cluster may be connected 216. The controller also may be connected 236 to a network 226 that hosts sensors 227, instruments 237 and other devices, potentially including tools 217. While this figure illustrates the controller being connected via a network to the sensors, it could alternatively use SECS-I or another, serial-based protocol to connect with sensors.

Figure 3:
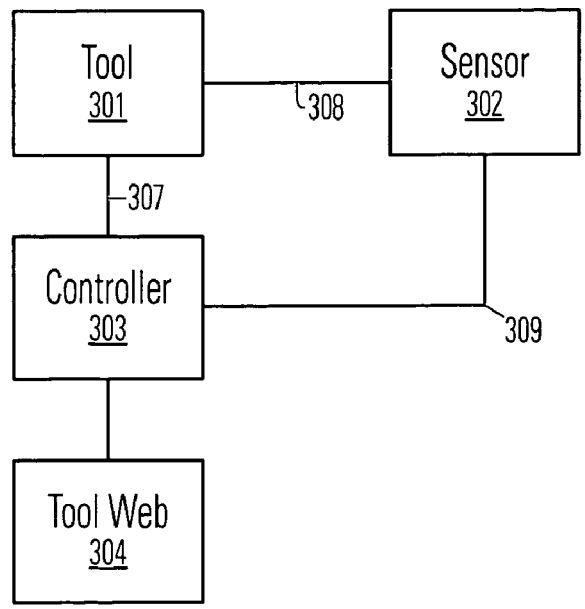
FIG. 3 is a block diagram of a controller using a single type of communication channel to communicate with a tool, sensor, and tool host.
Figure 4:
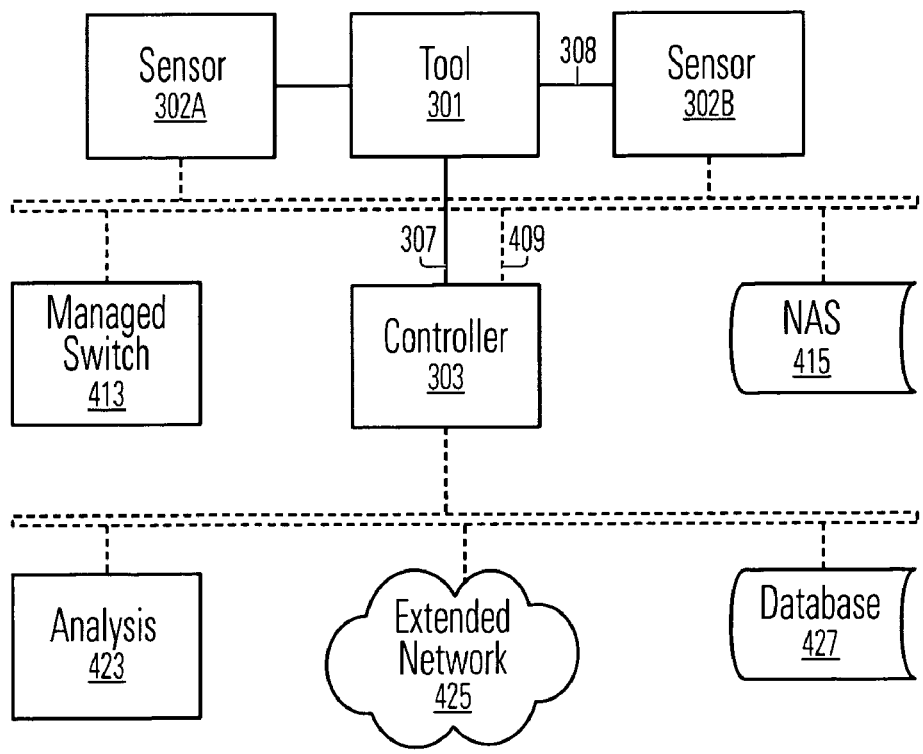
FIG. 4 illustrates using multiple types of communication channels.

FIG. 3 is a block diagram of a controller using a single type of communication channel to communicate with a tool, sensor, and tool host. FIG. 4 illustrates using multiple types of communication channels. In FIG. 3, a SECS dominated scenario is illustrated. The controller 303 uses a SECS protocol 307, 309 to communicate with both the tool 301 and the sensor 302. The connection 308 between the tool 301 and sensor 302 may involve any type of energy or force normally sensed, including any of the sensations identified in the discussion of FIG. 1. In FIG; 4, a more complex combination of SECS and network communications are illustrated. The only SECS communications channel 307 in this scenario is between the controller 303 and host 301. A tool side network 409 connects the controller with sensors 302A–B, managed switch 413 and network attached storage (NAS) 415. A fab side network 419 connects the controller 303 with analysis software 423 such as a traditional tool host or distributed processors, with an extended network 425 such as the Internet, a VPN or a dedicated internal network, and a database 427 that persists or stores data published by the controller. Alternatively, the database 427 could reside on the controller 303.

Figure 5:
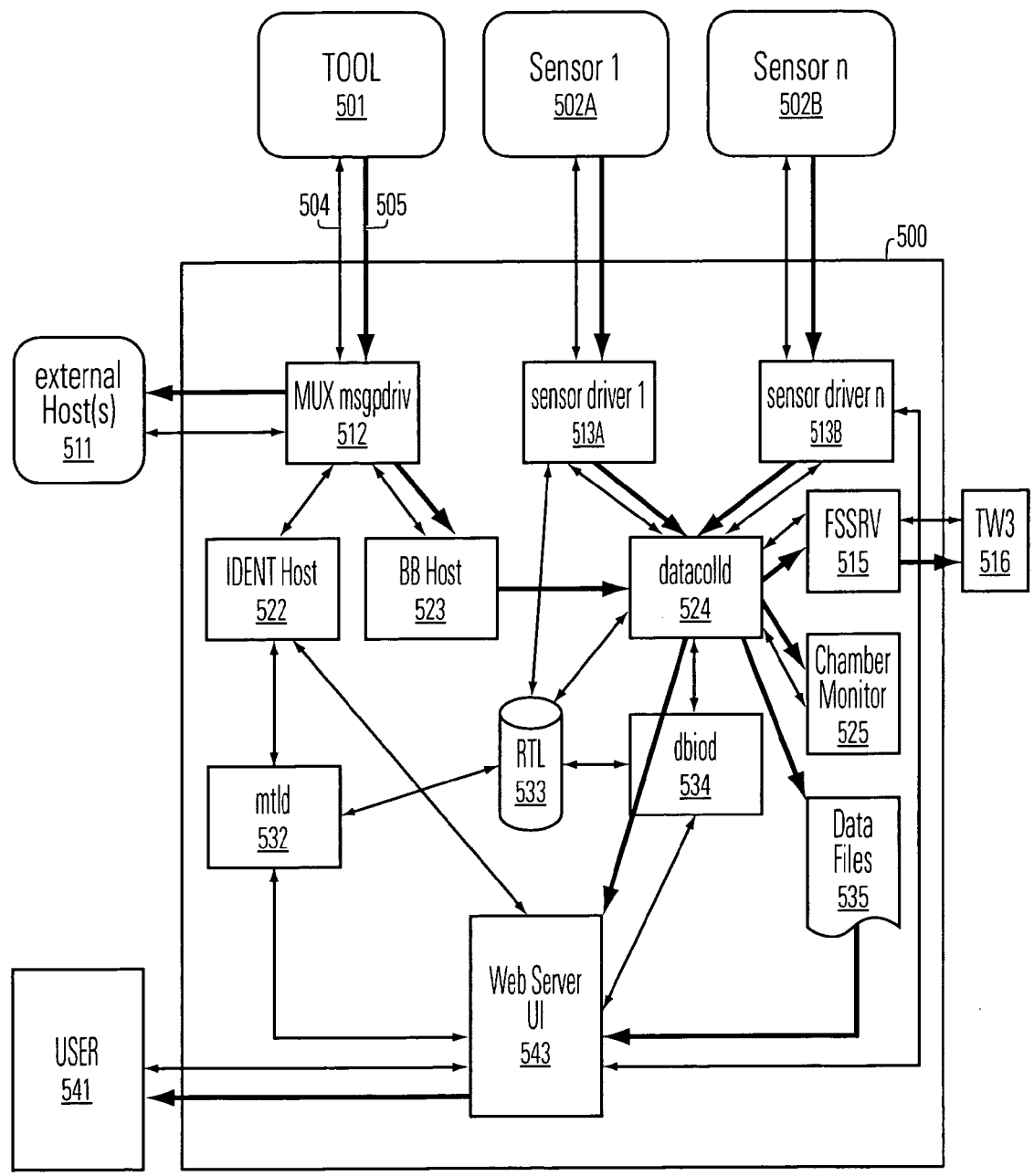
FIG. 5 is a block diagram of software and hardware components that may be used to build a controller.

FIG. 5 is a block diagram of software components that may be used by a controller 500. This controller 500 is in communication with an external host 511, a tool 501 and sensors 1 . . . n, 502A–B. Communications include both control information indicated by light weight arrows that typically are double ended and data indicated by heavy, dark arrows 505 that typically are single ended.

In FIG. 5, the controller 500 includes several components for managing communications with a tool 501, sensors 502A–B, external host(s) 511 and data users 541. The MUX msgpdriv 512 is a multiplexer that handles SECS protocol communications with at least one tool 501 and one or more external hosts 511. Control information flow is indicated by light double ended connecting lines, e.g. 504. Data reports are indicated by heavier single ended lines 505. Some data flows may not be fully represented by the data report arrows, for instance retrieval of data from data files for transmission to external hosts. The MUX 512 exchanges control data 504 with the tool 501 and receives data reports 505. The MUX 512 exchanges control data with the external hosts 511 and sends data reports to them. The BB Host 523 is an internal host accessed by the MUX 512 to communicate with the outside world. In alternate embodiments, the BB Host 523 also might be accessed to provide data to a web server. The datacolld or data collection daemon 624 manages data. This daemon is responsive to data collection plans. It knows how to get data from various internal and external sources. When it wants tool data, for instance, it sends requests to the BB Host 523, which translates the requests into SECS and passes the requests to the tool 501. In an alternate embodiment, the BB Host might have an Ethernet based communication channel for communications with the tool 501. To communicate with sensors 502A–B, the data collection daemon 524 communicates with sensor drivers 513A–B. The daemon 524 provides data to a so-called fab side server FSSRV with is accessible 515 to a so-called external tool web server 526. The data collection daemon 524 persists data in data files 535. These data files 535 include at least one wafer file for recording data regarding specific wafers. The data collection daemon may provide data reports directly (or indirectly) to a web server user interface 543. The web server interface may access the data files 535 through the data collection daemon 524 or by directly accessing the data files 535. The data collection daemon may pass control information to a web server UI 543 through a database I/O daemon 534. The database I/O daemon manages run time library data 533, such as identification about an attached tool. In this configuration, the run time library is more a data collection than a set of dynamically linked program routines, except to the extent that data is encapsulated and accessed by methods that may be stored in the library 533. The mtld or master tool library daemon 532 knows how to query tools generally and, specifically, the tool 501 connected to the controller 500. There is not yet a general convention for extracting tool capability data. The specialized knowledge of how to query the tool for its capabilities resides with the mtld 532. The IDENT Host 522 knows how to communicate with specific tools that may speak dialects of SECS. The IDENT Host 522 communicates with the MUX 512 on behalf of both the mtld daemon 532 and the web server interface 543.

Message Flow

Figures 6, 7:
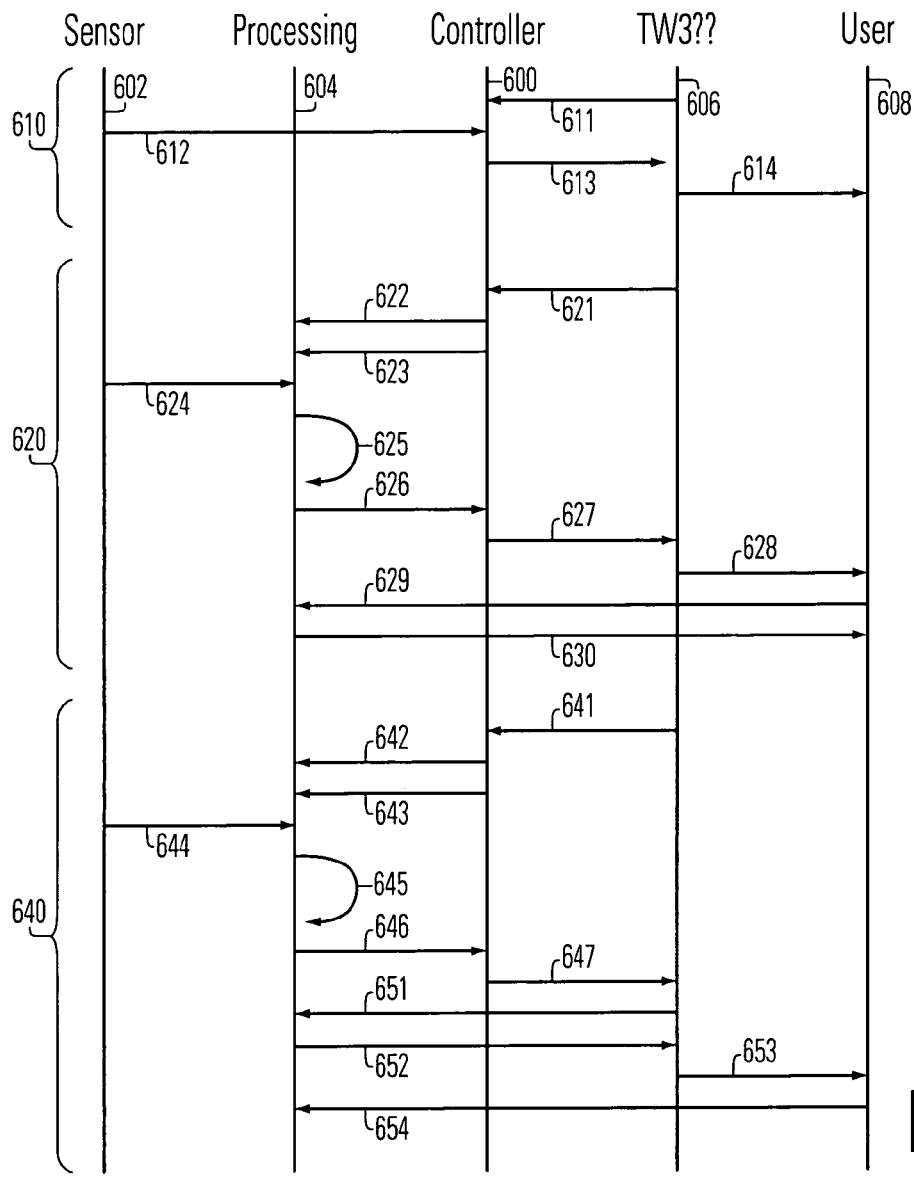
FIG. 6 illustrates message flows including a controller and various types of sensors.
FIG. 7 is a sample message that a controller may use to inform a sensor of the present context of operation of a tool/workpiece.

FIG. 6 illustrates message flows including a controller and various types of sensors. FIG. 7 is a sample message that a controller may use to inform a sensor of the present context of operation of a tool/workpiece. In FIG. 6, message flows with a simple sensor 610, an advanced sensor 620 such as SenseLink and a complex sensor 630 such as the RGA mentioned above. The messaging participants include the controller (e.g., Blue Box) 600, the sensor 602, processing (e.g., SenseLink or onboard logic and resources) 604, a distributed processor, tool host or software package designed to interact with the controller 600 (e.g., a so-called tool web server) and a user 608. In the first message flow 610, analysis software 606 posts a request 611 to the controller 600. This may be accomplished using an HTML post command with a controller that has an embedded web server, such as an Apache server running on embedded Linux. The controller has been listening for data transmitted 612 by a simple sensor 602. The controller identifies the data responsive to the request 611 and transmits it 613 back to the analysis software 606. The data transmitted may have been stored by the controller or in memory accessible to the controller, or it may be a future data stream from the sensor. The analysis software 606 makes the data accessible 614 to the user 608.

In the second message flow 620, the initial request(s) 621 again flow from the analysis software 606 to the controller 600. The controller in turn submits 622 a data collection plan DCP to the logic and resources 604 that handle processing for the sensor 602. Several different DCPs are submitted for processing, to be applied in the proper context. After the DCPs are in place, the controller can publish a context 623, which the processing resources interpret to invoke a DCP. In accordance with the DCP, the processing resources 604 collect readings 624 from the sensor 602. Data selection and/or reduction 625 are carried out by the processing resources 604. This selection and/or reduction 625 may include persistence of data either with the device that carries out the processing, on a network attached storage device (e.g., 415) or on a database. That is, data can be persisted with the processing device or external to the processing device. Responsive to the context conveyed 623 by the controller 600, the processing resources 604 provide data 626 in accordance with the DCP. The controller forwards the data 627 to the analysis software 606 responsive to the request(s) 621. The analysis software 606 makes the data accessible 614 to the user 608. Once the user 608 has established a link with the processing resources 605, for instance using a browser that accesses an Apache server running on embedded Linux, exchanges of requests 629 and responses 630 can flow directly, bypassing the controller 600 and/or the analysis software 606.

In the third message flow 630, the initial request(s) 631 yet again flow from the analysis software 606 to the controller 600. The controller in turn submits 642 a data collection plan DCP to the logic and resources 604 that handle processing for the sensor 602. As above, several different DCPs are submitted for processing, to be applied in the proper context. After the DCPs are in place, the controller can publish a context 643, which the processing resources interpret to invoke a DCP. In accordance with the DCP, the processing resources 604 collect readings 644 from the sensor 602. Data selection and/or reduction 645 are carried out by the processing resources 604. This selection and/or reduction 645 may include persistence of data either with the device that carries out the processing, on a network attached storage device (e.g., 415) or on a database. That is, data can be persisted with the processing device or external to the processing device. Responsive to the context conveyed 643 by the controller 600, the processing resources 604 provide data 646 in accordance with the DCP. The controller forwards the data 647 to the analysis software 606 responsive to the request(s) 641. In this third scenario, once the analysis software 606 has established a link with the processing resources 605, for instance using a browser that accesses an Apache server running on embedded Linux, exchanges of requests 646 and responses 647 can flow directly, bypassing the controller 600. The analysis software 606 makes the data accessible 653 to the user 608. Once the user 608 has established a link with the processing resources 605, for instance using a browser that accesses an Apache server running on embedded Linux, exchanges of requests 654 and responses 655 can flow directly, bypassing the controller 600 and/or the analysis software 606.

Fab Side Protocol

For communications between analysis software or a fab side server 606 and the controller 600, messages may be passed back and forth in form of XML documents over HTTP as a transport protocol. Other message formats and transport protocols may be substituted. The first element of each XML document (Msg) may specify ToolId, as a string, which a is server message giving the name of the tool to which the controller is attached. The message may include the time of day (TOD) in a predetermined format, such as MM/DD/YYYY hh:mm:ss.ms. Optionally, a UTC difference or offset may be provided. For instance:

```
<?xml version="1.0"?>
    <Msg ToolId="ETCH-1" TOD="03/07/2003 01:25:07.207"
    UTCDIFF="+0800">
    </Msg>
```

The fab side server 606 (FSSrv) may be implemented using a pull model for the communication layer. Applying this model, users 608 ask the server 606 to send back the information of interest. This provides data persistence for the FSSrv in the event of a communication or other transfer failure. Furthermore, FSSrv will not have to maintain any connection state information. By virtue of being stateless, FSSrv will be resilient to failures, all failure recovery being performed on the client side. Other models for the communication layer also may be applied.

Users successfully connected to FSSrv will be able to send commands by using the HTTP POST verb in the header of the request message.
POST/ToolWeb/Cmd/HTTP/1.1
Content-type: text/xml

```
<Msg ToolId="ETCH-1" TOD="03/07/2003 01:25:07.207"
UTCDIFF="+0800">
    <Command>
    </Command>
</Msg>
```

The <command> token will be usually the second element of the XML document carried in the request message content.

A pull request may be specified in form of generic HTTP GET.
GET/ToolWeb HTTP/1.1
Accept: text/xml On receiving generic requests the server will reply with information about its internal status/configuration.

Communications may proceed based on sequence numbers or an acknowledgement protocol. Using the acknowledgement protocol, a user will typically specify its availability by sending ACK messages as a parameter in the URI string. When missing or ack=0 the server will exit this communication mode. A pull request with ACK flag will be specified in form of generic HTTP GET.
GET/ToolWeb?ack=1 HTTP/1.1
Accept: text/xml On receipt of an answer to a pull request, the client will be in charge of sending an acknowledge message ACK on success, NAK otherwise. Usually a NAK will be sent when a client encounters certain problems while processing the message.

POST/ToolWeb/Acknowledge HTTP/1.1
Content-type: text/xml

```
<Msg ToolId="ETCH-1" TOD="03/07/2003 01:25:07.207"
UTCDIFF="+0800">
    <ACK />
</Msg>
```

POST/ToolWeb/Acknowledge HTTP/1.1
Content-type: text/xml

```
<Msg ToolId="ETCH-1" TOD="03/07/2003 01:25:07.207"
UTCDIFF="+0800">
    <NAK />
</Msg>
```

When an ACK has been received, the FSSrv will pop from its internal buffer a message transmitted to client on a prior pull request.

A user may request identification of available data sources and receive a response:

```
POST /ToolWeb/Cmd/ HTTP/1.1
Content-type: text/xml
<Msg ToolId="ETCH-1" TOD="03/07/2003 01:25:07.207"
UTCDIFF="+0800">
    <DataSourcesRequest />
</Msg>
```

The reply:

```
HTTP/1.1 200 OK
Content-Type: text/xml
<?xml version="1.0"?>
<Msg ToolId="ETCH-1" TOD="03/07/2003 01:25:07.207"
UTCDIFF="+0800">
    <DataSourcesResponse>
        <Tool>
            <Chamber N="A"/>
            <Chamber N="B"/>
            <Chamber N="B"/>
        </Tool>
        <Source N="RGA1" ChPos="A"/>
        <Source N="RGA2" ChPos="B"/>
        <Source N="VIProbe1" ChPos="A"/>
    </DataSourceResponse>
</Msg>
```

FSSrv will allow ToolWeb server and any other third party applications create collection plans, control their status and receive the data published from the data collection engine residing on the controller 600. Collection plans are typically linked to a chamber. In some cluster tools, there are transitory chambers that are used of handling, cooling and the like, which also may be designated as chambers. Cluster tools also have a center hub sometimes called a Mainframe that also can be logically treated as a chamber. Some events, such as lot start, may better be linked to the Mainframe than to any other chamber. Following a controller's interpretation of the Mainframe as a regular chamber it would be possible to link a collection plan to the Mainframe. In one embodiment, the controller would collect data from different sources (tool/sensors) semantically connected by the targeted chamber (including Mainframe). For instance, if an RGA sensor is connected on chamber A one could imagine a DCP linked to chamber A, collecting data from the tool and sensor as well. To support multiple contexts, multiple collection plans may be linked to the same chamber.

When data collection plans have been defined, a request can be sent to find out what plans are in place:

```
POST /ToolWeb/Cmd HTTP/1.1
Content-type: text/xml
<?xml version="1.0"?>
<Msg ToolId="ETCH-1" TOD="03/07/2003 01:25:07.207"
UTCDIFF="+0800">
<GetPlanDefinitionRequest>
    <DCP Name="RGA_TEST" ChPos="B"/>
<GetPlanDefinitionRequest/>
</Msg>
```

In response:

```
<?xml version="1.0" encoding="UTF-8"?>
<Msg ToolId="OT" TOD="11/24/2003 19:29:51.910" UTCDIFF="+0100">
<GetPlanDefinitionResponse>
    <DCP Name="RGA_TEST" ChPos="B">
        <EVIDS>
            <V N="SVID_1010" D="susceptor temp/wafer temp 0"/>
            <V N="SVID_1025" D="chamber cryo temp 0"/>
            <V N="SVID_1040" D="chamber cryo TC pressure 0"/>
            <V N="SVID_1055" D="chamber AC current sensor 1 0"/>
            <V N="SVID_1070" D="chamber AC current sensor 2 0"/>
            <V N="SVID_1085" D="chamber AC current sensor 3 0"/>
            <V N="SVID_1100" D="chamber RF match load bld pos 0"/>
            <V N="SVID_1115" D="chamber RF match tune bld pos 0"/>
            <V N="SVID_1130" D="chamber dc bias 0"/>
            <V N="SVID_1145" D="etch chamber emission 1 0"/>
            <V N="SVID_1160" D="etch chamber emission 2 0"/>
            <V N="SVID_1235" D="forward pwr 0"/>
            <V N="SVID_1250" D="reflected pwr 0"/>
            <V N="SVID_1295" D="rf 2 reflected pwr 0"/>
            <V N="SVID_1475" D="etch clamp top 0"/>
        </EVIDS>
    </DCP>
</GetPlanDefinitionResponse>
</Msg>
```

Data is published, preferably in XML format:

```
GET /ToolWeb?dcp=ccc HTTP/1.1
Accept: text/xml
GET /ToolWeb?dcp=ccc&seq=x HTTP/1.1
Accept: text/xml
```

For a single data sample reply:

```
HTTP/1.1 200 OK
Content-Type: text/xml
<?xml version="1.0"?>
<Msg ToolId="ETCH-1" TOD="03/07/2003T01:25:07.207Z"
UTCDIFF="+0800">
<Data DCP="ColPlan_ChA" ChPos="A" DCPSeq="x"
CtrlSeq="1.1.0"
Time="01:25:07.204Z">
    <V N="TIMEDIFF">+00:01:29</V>
    <V N="ECID_211">2.3</V>
    <V N="ECID_212">211</V>
    <V N="SVID_201">12.3</V>
    <V N="SVID_304">34.5</V>
    <V N="ECID_211">2.3</V>
    <V N="ECID_212">211</V>
    <V N="SVID_201">12.5</V>
    <V N="SVID_304">34.7</V>
</Data>
</Msg>
```

For a composite data reply:

```
HTTP/1.1 200 OK
Content-Type: text/xml
<?xml version="1.0"?>
<Msg ToolId="ETCH-1" TOD="03/07/2003 01:25:07.207"
UTCDIFF="+0800"
SeqS="567" SeqE="700">
<Data DCP="ColPlan_ChA" ChPos="A" DCPSeq="567" DBSeq="111"
CtrlSeq="1.1.0" Time="01:25:07.204Z">
    <V N="TIMEDIFF">+00:01:29</V>
    <V N="ECID_211">2.3</V>
    <V N="ECID_212">211</V>
    <V N="SVID_201">12.3</V>
    <V N="SVID_304">34.5</V>
    <V N="ECID_211>2.3</V>
    <V N="ECID_212">211</V>
    <V N="SVID_201">12.5</V>
    <V N="SVID_304">34.7</V>
</Data>
<Data DCP="ColPlan_ChA" ChPos="A" DCPSeq="568" DBSeq="127"
CtrlSeq="1.1.0" Time="01:25:08.204Z">
    <V N="TIMEDIFF">+00:01:29</V>
    <V N="ECID_211">2.3</V>
    <V N="ECID_212">211</V>
    <V N="SVID_201">12.3</V>
    <V N="SVID_304">34.5</V>
    <V N="ECID_211">2.3</V>
    <V N="ECID_212">211</V>
    <V N="SVID_201">12.5</V>
    <V N="SVID_304">34.7</V>
```

```
</Data>
</Msg>
```

Basically there are three main events when control parameter updates are to be sent, all related to an individual chamber: the process start, step change and process end. The following table illustrates the control sequence to event association:

| Event/Message | CtrlSeq | LotName | WaferNo | RecipeName | Step |
|---|---|---|---|---|---|
| Process Start | (1.1.0) | — | — | — | 0 |
| Step Change | (1.1.1) | — | — | R1 | 1 |
| Step Change | (1.1.2) | — | — | R1 | 2 |
| Step Change | (1.1.3) | L1 | — | R1 | 3 |
| Process End | (1.1.3) | L1 | W1 | R1 | 3 |
| Out of process | (1.1.-1) | — | — | — | — |
| Out of process | (1.1.-1) | — | — | — | — |
| Process Start | (1.2.0) | — | W2 | — | 0 |
| Step Change | (1.2.1) | — | W2 | — | 1 |
| Step Change | (1.2.2) | — | W2 | — | 2 |
| Step Change | (1.2.3) | — | W2 | R1 | 3 |
| Step Change | (1.2.4) | — | W2 | R1 | 4 |
| Process End | (1.2.4) | L2 | W2 | R1 | 4 |
| Out of process | (1.2.-1) | — | — | — | — |
| Out of process | (1.2.-1) | — | — | — | — |

Below follows an example of control sequence notification:

```
GET /ToolWeb?dcp=ccc HTTP/1.1
Accept: text/xml
GET /ToolWeb?dcp=ccc&seq=x HTTP/1.1
Accept: text/xml
GET /ToolWeb?dcp=ccc&seq=x&off=y HTTP/1.1
Accept: text/xml
```

Reply:

```
HTTP/1.1 200 OK
Content-Type: text/xml
<?xml version="1.0"?>
<Msg ToolId="ETCH-1" TOD="03/07/2003 01:25:07.207"
UTCDIFF="+0800">
<CtrlParam N="ProcessStart" ChPos="A" DCPSeq="45"
CtrlSeq="1.1.0">
    <LotName>QWE-23</LotName>
    <WaferNo>34</WaferNo>
    <RecipeName>PT-1</RecipeName>
    <Step>4</Step>
</CtrlParam>
</Msg>
HTTP/1.1 200 OK
```

Content-Type: text/xml

```
<?xml version="1.0"?>
<Msg ToolId="ETCH-1" TOD="03/07/2003 01:25:07.207"
UTCDIFF="+0800">
<CtrlParam N="StartStep" ChPos="A" DCPSeq="46"
CtrlSeq="1.1.1">
    <LotName>QWE-23</LotName>
    <WaferNo>34</WaferNo>
    <RecipeName>PT-1</RecipeName>
    <Step>4</Step>
</CtrlParam>
</Msg>
HTTP/1.1 200 OK
```

Content-Type: text/xml

```
<?xml version="1.0"?>
<Msg ToolId="ETCH-1" TOD="03/07/2003 01:25:07.207"
UTCDIFF="+0800">
<CtrlParam N="ProcessEnd" ChPos="A" DCPSeq="47"
CtrlSeq="1.1.3">
    <LotName>QWE-23</LotName>
    <WaferNo>34</WaferNo>
    <RecipeName>PT-1</RecipeName>
    <Step>4</Step>
</CtrlParam>
</Msg>
```

In this example, ChPos is the chamber position the control sequence is specified for, LotName is the name of the lot getting processed within the chamber, WaferNo is the number of the wafer getting processed within the chamber, RecipeName is the name of the recipe used for wafer processing in the chamber, and Step is the step number or name of the current recipe.

Tool Side Protocol

The controller bridges the fab side and the tool side, as illustrated in FIGS. 2 and 4. Separate but similar protocols may be used for communication on the two sides.

For communications between a controller and smart sensor, HTTP/1.1 may be used to send and receive XML documents. When a POST verb is used, and a client sends a Body with the request, and adds a Content-Length header signifying the size of the body. The server may send a response body, although for some response types a body is optional (e.g. error codes). The server can chose any of the three methods: header (content-length), chinked or connection to delimit the size of the body.

The controller can determine the capabilities of a smart sensor using a capabilities request:

```
POST /ToolWeb/<SUB-SENSOR-NAME>/Cmd HTTP/1.1
Content-type: text/xml
<?xml version="1.0" ?>
<CapabilitiesRequest />
```

The response may vary, depending on how extensive the capabilities are. Sensors hosting multiple sub-sensors will respond with the Sub-Sensor list on a general Capabilities-Request.

```
HTTP/1.1 200 OK
Content-Type: text/xml
<?xml version="1.0" ?>
<CapabilitiesResponse>
    <Sensor Name="SensorName"
        Type="SensorType"
        Model="SensorModel"
        Manufacturer="SensorManufacturer"
        Version="FirmwareRevision"
        HWVersion="HardwareRevision"
        SerialNumber="SensorSerialNumber"
        Configuration="DeviceConfiguration"
        IsOnline="IsOnline"
    />
</CapabilitiesResponse>
```

On receiving a "CapabilitiesRequest" message the sensor typically replies with a "CapabilitiesResponse" message.

```
HTTP/1.1 200 OK
Content-Type: text/xml
<?xml version="1.0" ?>
<CapabilitiesResponse>
    <EVIDS>
        <V Name="EVID-No"
            Format="EVID-Format"
            Units="EVID-Unit"
            Description="EVID-Description"
            Dimensions="EVID-Dimensions" />
    </EVIDS>
    <Events>
        <Event ID="ECEID-NO"
            Description="ECEID-Description" />
    </Events>
    <Poll Enabled="PollEnabled"
        MaxEVIDsPerPoll="MaxEVIDsPerPoll"
    />
    <Trace Enabled="CRTraceEnabled"
        MaxTraces="MaxTraces"
        BufferSize="TracebufferSize"
    />
    <ControlSequence Enabled="ControlSequenceEnabled" />
    <SetConstant Enabled="SetConstantEnabled" />
    <CONSTANT>
        <C Name="EVID-No"
            Format="EVID-Format"
            Description="EVID-Description"
            Dimensions="EVID-Dimensions" />
    </CONSTANT>
    <Protocol Version="TOOLwebToolSideVersion" />
    <Sensor Name="SensorName"
        Type="SensorType"
        Model="SensorModel"
        Manufacturer="SensorManufacturer"
        Version="FirmwareRevision"
        HWVersion="HardwareRevision"
        SerialNumber="SensorSerialNumber"
        Configuration="DeviceConfiguration"
        IsOnline="IsOnline"
    />
    <DateTime Format="DateTimeFormat" />
</CapabilitiesResponse>
```

In more concrete examples, a sub-sensor list might be:

```
<CapabilitiesResponse>
    <Sensor Name="DeGas" Type="CIS" Model="200D" Version="1.00"
        SerialNumber="LM70123456" IsOnline="TRUE"/>
    <Sensor Name="Etch1" Type="CIS" Model="200D" Version="1.00"
        SerialNumber="LM70123456" IsOnline="TRUE"/>
    <Sensor Name="Etch2" Type="CIS" Model="200D" Version="1.00"
        SerialNumber="LM70123456" IsOnline="FALSE"/>
</CapabilitiesResponse>
```

A list of available extended variable IDs might be:

```
<CapabilitiesResponse>
    <EVIDS>
        <V Name="101" Format="boolean" Units="Boolean" Description="online" />
        <V Name="102" Format="decimal" Units="Pascal" Description="Mass 1" />
        <V Name="103" Units="Pascal" Description="Mass 2" />
        <V Name="104" Units="Pascal" Description="Mass 3" />
        <V Name="105" Units="Pascal" Description="Mass 4" />
        <V Name="105" Units="Pascal" Description="Mass 5" Dimensions="2 3" />
    </EVIDS>
    <Events>
        <Event ID="1234" Description="Measurement Start" />
        <Event ID="1234" Description="Measurement Stop" />
    </Events>
    <Poll Enabled="True" MaxEVIDsPerPoll="100" />
    <Trace Enabled="True" MaxTraces="4" BufferSize="100" />
    <ControlSequence Enabled="False" />
    <SetConstant Enabled="True" />
    <CONSTANT>
        <C Name="2222" Format="decimal" Description="Setpoint 1" />
        <C Name="2222" Format="decimal" Description="Setpoint 2" />
        <C Name="2222" Description="Setpoint 3" Dimensions="1 2" />
    </CONSTANT>
    <Protocol Version="1.0" />
    <Sensor Name="ETCH1" Type="myType" Model="567" Manufacturer="Somebody"
        Version="1.3.4" HWVersion="2b" SerialNumber="12345" IsOnline="True" />
    <DateTime Format="W3XML" />
</CapabilitiesResponse>
```

Sensors may expose data in the form of Extended VIDs or EVIDs. The sensors are responsible for maintaining (defining) EVID addresses. EVIDs may be acquired by pooling, tracing or limits. When polling, the controller requests one or more EVIDs at arbitrary times. All sensors must support polling. When tracing, the controller requests one or more EVIDs to be sent at a pre-defined period. Trace is optionally supported by smart sensors. To address issues related to sending many messages it is possible to group data generated by a Trace Requests. The sensor buffers the data and time stamps it. Support for buffering is optional. When limiting, the controller requests one or more EVIDs to be sent if the value of the EVID has changed by a pre-defined limit. Smart sensor support for limiting is optional.

An example "bulk" trace request and response follow, including variable that have multiple values (arrays):

```
GET /ToolWeb/DeGas/Trace?Name=TRID_1&Seq=1234567 HTTP/1.1
Accept: text/xml
HTTP/1.1 200 OK
Content-Type: text/xml
<Data>
    <BulkTrace Name="TRID_1" Time="12345678.000" Rate="100" Seq="1234567"
        Repeat="5">
        <Header>
            <V Name="EVID_101"/>
            <V Name="EVID_102"/>
            <V Name="EVID_108"/>
        </Header>
        <V><V>1.1</V> <V>1.2</V> <V>1.3</V><V>1.4</V><V>1.5</V></V>
        <V><V>2.1</V> <V>2.2</V> <V>2.3</V><V>2.4</V><V>2.5</V></V>
        <V><V>3.1</V> <V>3.2</V> <V>3.3</V><V>3.4</V><V>3.5</V></V>
    </BulkTrace>
</Data>
```

Sensors will optionally expose Events. Events may provide for data collection, alarms or other purposes. For data collection, for example, an RGA or an FTIR spectrometer may expose a "Scan Complete" event. As an alarm, a smart sensor can warn the system of problems either internal to the sensor (e.g. "Calibration Failed") or fault detection using acquired data (e.g. "Chamber Air Leak"). The payload of an event message might be:

```
<Data>
    <Event Name="12345" Time="12345678.000" Seq="1234567" ></Event>
    <Event Name="54321" Time="12345679.210" Seq="1234568" ></Event>
</Data>
```

A control sequence message, which may be used by a controller to set a context, is depicted in FIG. 7. The names given to elements are self-explanatory.

Some Particular Embodiments

The present invention may be practiced as a method or device adapted to practice the method. The same method can be viewed from the perspective of a smart sensor or adapter, such as SenseLink, or from the perspective of a controller, such as Blue Box. The invention may be an article of manufacture such as media impressed with logic to carry out computer-assisted sensor control.

One embodiment is a controller-aided method of monitoring processes or equipment performance in a semiconductor manufacturing operation. This method includes identifying in a controller a plurality of smart sensors that are configured to recognize a plurality of context descriptions and to adapt their sensing of data from one or more semiconductor manufacturing devices, responsive to the context descriptions. The smart sensors may be configured through the controller, with the identification being a consequence of the configuration. Configuration data may be loaded into the controller, to configure the controller. Alternatively, the controller may discover the capabilities of a tool from the tool or some other source that already knows the capabilities of the tool. The method further includes recognizing in the controller a current context of operation of a particular semiconductor manufacturing device. The manufacturing device may publish events, from which the controller recognizes the current context. Alternatively, the controller may poll the manufacturing device regularly to determine its current context. In another embodiment, control commands sent to the tool may pass through the controller or originate from the controller, so that the tool need only acknowledge the command for the controller to know the tool's context. The method further includes transmitting to one or more particular smart sensors associated with the particular semiconductor manufacturing device the current context. The current context may be transmitted in the form of an XML message, a SECS message or some other format. The method also may include receiving data sensed by the particular smart sensors responsive to the transmitted current context.

In alternate embodiments, the smart sensors may respond to the transmitted current context by reducing the data or otherwise preprocessing it before sending it to the controller. In these embodiments, the smart sensors may persist all or most of the data sensed while transmitting a preprocessed version of the data. The data persisted may be available in response to a later inquiry. Alternatively, the smart sensors may respond to the transmitted current context by undertaking sensor calibration; or, the smart sensors may evaluate their own health by comparing their meetings in a particular current context to expected operating or design ranges. A progression of current contexts may be used for sensor calibration or health evaluation.

One aspect of the present invention, applicable to any of the embodiments above, is the controller requesting at least one specific smart sensor among the particular smart sensors to provide additional detail from the data sensed. This request may identify the additional data requested specifically enough that the smart sensor can select from among all additional detail available the additional detail requested.

Identifying the smart sensors may include discovery by the controller of a smart sensor, where the controller and smart sensors are coupled by a network. Alternatively, identifying may involve loading data into the controller.

The current context may involve one, two, three or more of: a process being conducted on the particular semiconductor manufacturing device, a current processing state of the particular semiconductor manufacturing device, the name of the recipe, identification of a recipe step being used, identity of the lot of wafers, or the identity of a wafer being processed. In this context, the particular semiconductor manufacturing device may be a chamber of a cluster tool or it may be a logical entity that applies to the cluster or processing lot as a whole.

Any of the methods described above or aspects of the methods may be embodied in a controller adapted to monitoring processes or equipment performance and SMI connector manufacturing operation. This device may include processor, memory coupled to the processor, one or more ports coupled to the processor (or the memory) adapted to communicate with smart sensors and logic and resources operable with the processor adapted to carry out the methods. In particular, the logic and resources may identify a plurality of smart sensors that are configured to recognize a plurality of context descriptions and to adapt the smart sensor sensing of data from one or more semiconductor manufacturing devices, responsive to the context descriptions. The logic and resources further may recognize a current context of operation for a particular semiconductor manufacturing device, transmit it to one or more particular smart sensors associated with the particular semiconductor manufacturing device the current context, and receive from the particular smart sensors data sensed by the smart sensors, responsive to the transmitted current context.

Another method embodying the present invention is a controller-aided method of monitoring equipment performance in a semiconductor manufacturing operation. This method includes receiving a controller reduced data from one or more particular smart sensors associated with the particular semiconductor manufacturing data. The reduced data in this data reduced from data sensed by the smart sensors responsive to a current context of operation of the particular semiconductor manufacturing device. The method further includes analyzing at the controller the reduced data, responsive to the current context, and determining that additional data should be requested. A request may be transmitted for additional detail from at least one specific smart sensor, seeking additional data from the data sensed by the smart sensor. In this context, a request for the smart sensor may go to the smart sensor itself or to a data storage entity logically associated with the smart sensor. The request for additional data may be specific enough that the specific smart sensor or data storage entity can select among all additional detail available the specific additional data requested. This method further may include recognizing in the controller the current context of operation of the particular semiconductor manufacturing device and transmitting that context to one or more particular smart sensors. The aspects of the methods above may generally be combined with this method.

In another embodiment, instead of the controller analyzing the data and initiating a request, the controller may provide a user at least some of the reduced data and receive from the data user an inquiry for additional data. This embodiment may, of course, be combined with other aspects of the methods.

The methods described immediately above and aspects or embodiments of the methods may be embodied in a controller adapted to monitoring processes or equipment performance and SMI connector manufacturing operation. This device may include processor, memory coupled to the processor, one or more ports coupled to the processor (or the memory) adapted to communicate with smart sensors and logic and resources operable with the processor adapted to carry out the methods. In particular, the logic and resources may receive reduced data from one or more particular smart sensors associated with a particular semiconductor manufacturing device, the reduced data having been reduced from data sensed by the smart sensors responsive to a current context of operation of the particular semiconductor manufacturing device. The logic and resources further may be adapted to analyze the reduced data, responsive to the current context, and determine that additional data should be requested. The logic and resources further may transmit to at least one specific smart sensor a request for the additional detail from the data sensed. In alternate embodiments, the logic and resources may be adapted to provide a data user with at least some of the reduced data and receive from the data used or an inquiry for additional data, as an alternative to the controller analyzing reduced data and initiating a request.

The present invention also may be characterized from the perspective of the smart sensor, as opposed to the perspective of the controller. From this perspective, the present invention includes a controller-aided method the controlling equipment performance monitoring in semiconductor manufacturing. This method includes identifying to a controller capabilities in at least one smart sensor which is adapted to recognize a plurality of context descriptions into adapted sensing of data from an associated semiconductor manufacturing device. This adaptation may include how the sensor reduces data, how it adapts its calibration or how it evaluates its health, all responsive to the context descriptions. This method further includes receiving at the smart sensor from the controller a current context of operation of the semiconductor manufacturing device associated with the smart sensor and transmitting to the controller data sensed by the smart sensor, responsive to the received current context. Aspects of the preceding method may be combined with this method.

One aspect from the smart sensor perspective is that the smart sensor may include a simple sensor in a smart adapter, wherein the smart adapter includes logic and resources adapted to recognize a plurality of context descriptions and to adapt the smart sensors to sensing of data from an associated semiconductor manufacturing device responsive to the context descriptions. This simple sensor may be an incumbent sensor being adapted to respond to the current context received from the controller.

A device embodiment, from the smart sensor perspective, may be embodied in a device including a processor, memory coupled to the processor, one or more ports coupled to the processor (or the memory) adapted to communicate with smart sensors and logic and resources operable with the processor adapted to carry out the smart sensor methods. In particular, the logic and resources may recognize a plurality of context descriptions and adapt the smart sensor sensing of data from an associated semiconductor manufacturing despite responses to context descriptions. The logic and resources may further be adapted to receive from the controller a current context of operation of the semiconductor manufacturing device associated with the smart sensor and transmit it to the controller data sensed by the smart sensor, responsive to the received current context. As with the method, the smart sensor may include a simple sensor in a smart adapter. This simple sensor may be an incumbent sensor. In alternate embodiments, the logic and resources may be adapted to provide reduced data, receive an inquiry for additional data, and respond to the inquiry. The inquiry may be initiated by the controller or by a data user in direct communication with smart sensor.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted sensing, systems including logic to carry out sensor control, systems that take advantage of computer-assisted sensor control, media impressed with logic to carry out computer-assisted sensor control, data streams impressed with logic to carry out computer-assisted sensor control, or computer-accessible services that carry out computer-assisted sensor control. It is contemplated that modifications and combinations will readily occur to those skilled in the art, which modifications and combinations will be within the spirit of the invention and the scope of the following claims.

We claim:

1. A controller-aided method of monitoring processes or equipment performance in a semiconductor manufacturing operation, the method including:
    identifying in a controller a plurality of smart sensors that are configured to recognize a plurality of context descriptions and to adapt their sensing of data from one or more semiconductor manufacturing devices, responsive to the context descriptions;
    recognizing in the controller a current context of operation of a particular semiconductor manufacturing device;
    transmitting to one or more particular smart sensors associated with the particular semiconductor manufacturing device the current context; and
    receiving from the particular smart sensors data sensed by the smart sensors, responsive to the transmitted current context.

2. The method of claim 1, further including requesting that at least one specific smart sensor among the particular smart sensors provide additional detail from the data sensed.

3. The method of claim 2, wherein the request identifies the additional detail requested specifically enough that the specific smart sensor can select among all additional detail available the additional detail requested.

4. A controller-aided method of monitoring equipment performance in a semiconductor manufacturing operation, the method including:
    identifying in a controller a plurality of smart sensors that are configured to recognize a plurality of context descriptions and to reduce data sensed from one or more semiconductor manufacturing devices, based on the context descriptions;
    recognizing in the controller a current context of operation of a particular semiconductor manufacturing device;
    transmitting to one or more particular smart sensors associated with the particular semiconductor manufacturing device the current context; and
    receiving from the particular smart sensors reduced data sensed by the smart sensors, responsive to the transmitted current context.

5. The method of claim 4, further including requesting that at least one specific smart sensor among the particular smart sensors provide additional detail from the data sensed.

6. The method of claim 5, wherein the request identifies the additional detail requested specifically enough that the specific smart sensor can select among all additional detail available the additional detail requested.

7. The method of claim 4, wherein the identifying includes discovery by the controller of the smart sensors, the controller and the smart sensors being coupled by a network.

8. The method of claim 4, wherein the identifying includes loading identifying data into the controller.

9. The method of claim 4, wherein the current context includes identification of a process being conducted on the particular semiconductor manufacturing device.

10. The method of claim 9, wherein the semiconductor manufacturing device is a chamber of a multi-chamber cluster tool.

11. The method of claim 4, wherein the current context includes identification of a current processing state of the particular semiconductor manufacturing device.

12. The method of claim 4, wherein the current context includes identification of a recipe being used on the particular semiconductor manufacturing device.

13. The method of claim 4, wherein the current context includes identification of a recipe step being carried out on the particular semiconductor manufacturing device.

14. The method of claim 4, wherein the current context includes data identifying a wafer being processed by the particular semiconductor manufacturing device.

15. A controller-aided method of monitoring equipment performance in a semiconductor manufacturing operation, the method including:
    identifying in a controller a plurality of smart sensors that are configured to recognize a plurality of context descriptions and to calibrate their sensing of data from one or more semiconductor manufacturing devices, based on the context descriptions;
    recognizing in the controller a current context of operation of a particular semiconductor manufacturing device;
    transmitting to one or more particular smart sensors associated with the particular semiconductor manufacturing device the current context; and
    receiving from the particular smart sensors data, sensed by the smart sensors, calibrated responsive to the transmitted current context.

16. The method of claim 15, further including requesting that at least one specific smart sensor among the particular smart sensors provide additional detail from the data sensed.

17. The method of claim 16, wherein the request identifies the additional detail requested specifically enough that the specific smart sensor can select among all additional detail available the additional detail requested.

18. The method of claim 15, wherein the identifying includes discovery by the controller of the smart sensors, the controller and the smart sensors being coupled by a network.

19. The method of claim 15, wherein the identifying includes loading identifying data into the controller.

20. The method of claim 15, wherein the current context includes identification of a process being conducted on the particular semiconductor manufacturing device.

21. The method of claim 15, wherein the current context includes identification of a current processing state of the particular semiconductor manufacturing device.

22. The method of claim 15, wherein the current context includes identification of a recipe being used on the particular semiconductor manufacturing device.

23. The method of claim 15, wherein the current context includes data identifying a wafer being processed by the particular semiconductor manufacturing device.

24. A controller adapted to monitoring processes or equipment performance in a semiconductor manufacturing operation, the controller including:
   a processor;
   memory coupled to the processor;
   one or more ports coupled to the processor, adapted to communicate with smart sensors; and
   logic and resources operable with the processor, adapted to
      identify a plurality of smart sensors that are configured to recognize a plurality of context descriptions and to adapt their sensing of data from one or more semiconductor manufacturing devices, responsive to the context descriptions;
      recognize a current context of operation of a particular semiconductor manufacturing device;
      transmit to one or more particular smart sensors associated with the particular semiconductor manufacturing device the current context; and
      receive from the particular smart sensors data sensed by the smart sensors, responsive to the transmitted current context.

25. A controller-aided method of monitoring equipment performance in a semiconductor manufacturing operation, the method including:
   receiving at a controller reduced data from one or more particular smart sensors associated with a particular semiconductor manufacturing device, the reduced data having been reduced from data sensed by the smart sensors responsive to a current context of operation of the particular semiconductor manufacturing device;
   analyzing at the controller the reduced data, responsive to the current context, and determining that additional detail should be requested; and
   transmitting a request for the additional detail from the data sensed by at least one specific smart sensor.

26. The method of claim 25, wherein the request identifies the additional detail requested specifically enough that the specific smart sensor can select among all additional detail available the additional detail requested.

27. The method of claim 25, further including prior to the receiving step:
   recognizing in the controller the current context of operation of the particular semiconductor manufacturing device; and
   transmitting to the one or more particular smart sensors the current context.

28. The method of claim 25, wherein the identifying includes discovery by the controller of the smart sensors, the controller and the smart sensors being coupled by a network.

29. The method of claim 25, wherein the identifying includes loading identifying data into the controller.

30. The method of claim 25, wherein the current context includes identification of a process being conducted on the particular semiconductor manufacturing device.

31. The method of claim 25, wherein the current context includes identification of a current processing state of the particular semiconductor manufacturing device.

32. The method of claim 25, wherein the current context includes identification of a recipe being used on the particular semiconductor manufacturing device.

33. The method of claim 25, wherein the current context includes data identifying a wafer being processed by the particular semiconductor manufacturing device.

34. A controller adapted to monitoring equipment performance in a semiconductor manufacturing operation, the controller including:
   a processor;
   memory coupled to the processor;
   one or more ports coupled to the processor, adapted to communicate with smart sensors; and
   logic and resources operable with the processor, adapted to
      receive reduced data from one or more particular smart sensors associated with a particular semiconductor manufacturing device, the reduced data having been reduced from data sensed by the smart sensors responsive to a current context of operation of the particular semiconductor manufacturing device;
      analyze the reduced data, responsive to the current context, and determine that additional detail should be requested; and
      transmit to at least one specific smart sensor a request for the additional detail from the data sensed.

35. A controller-aided method of monitoring equipment performance in a semiconductor manufacturing operation, the method including:
   receiving at a controller reduced data from one or more particular smart sensors associated with a particular semiconductor manufacturing device, the reduced data having been reduced from data sensed by the smart sensors responsive to a current context of operation of the particular semiconductor manufacturing device;
   providing a data user at least some of the reduced data and receiving from the data user an inquiry for additional detail; and
   transmitting to at least one specific smart sensor a request for the additional detail from the data sensed.

36. A controller adapted to monitoring equipment performance in a semiconductor manufacturing operation, the controller including:
   a processor;
   memory coupled to the processor;
   one or more ports coupled to the processor, adapted to communicate with smart sensors and a data user; and
   logic and resources operable with the processor, adapted to
      receive reduced data from one or more particular smart sensors associated with a particular semiconductor manufacturing device, the reduced data having been reduced from data sensed by the smart sensors responsive to a current context of operation of the particular semiconductor manufacturing device;
      provide the data user at least some of the reduced data and receive from the data user an inquiry for additional detail; and
      transmit to at least one specific smart sensor a request for the additional detail from the data sensed.

37. A controller-aided method of controlling equipment performance monitoring in a semiconductor manufacturing operation, the method including:
- identifying to a controller capabilities of at least one smart sensor that is adapted
  - to recognize a plurality of context descriptions; and
  - to adapt its sensing of data from an associated semiconductor manufacturing device responsive to the context descriptions;
- receiving at the smart sensor from the controller a current context of operation of the semiconductor manufacturing device associated with the smart sensor; and
- transmitting to the controller data sensed by the smart sensor, responsive to the received current context.

38. The method of claim 37, further including receiving a request from the controller to provide additional detail from the data sensed.

39. The method of claim 38, wherein the request identifies the additional detail requested specifically enough that the specific smart sensor can select among all additional detail available the additional detail requested.

40. The method of claim 37, further including reducing data sensed by the smart sensor responsive to the transmitted current context and prior to transmitting the data sensed.

41. The method of claim 37, further including calibrating the smart sensor responsive to the transmitted current context and prior to transmitting the data sensed.

42. The method of claim 37, wherein the current context includes identification of a process being conducted on the particular semiconductor manufacturing device.

43. The method of claim 37, wherein the current context includes identification of a current processing state of the particular semiconductor manufacturing device.

44. The method of claim 37, wherein the current context includes identification of a recipe being used on the particular semiconductor manufacturing device.

45. The method of claim 37, wherein the current context includes data identifying a wafer being processed by the particular semiconductor manufacturing device.

46. The method of claim 37, wherein the smart sensor includes a simple sensor and a smart adapter, wherein the smart adapter includes logic and resources adapted
- to recognize a plurality of context descriptions; and
- to adapt the sensor's sensing of data from an associated semiconductor manufacturing device responsive to the context descriptions.

47. The method of claim 46, wherein the simple sensor is an incumbent sensor being adapted to respond to the current context received from the controller.

48. A smart sensor adapted to monitoring equipment performance in a semiconductor manufacturing operation, the smart sensor including:
- a processor;
- memory coupled to the processor;
- one or more ports coupled to the processor, adapted to communicate with at least one controller; and
- logic and resources operable with the processor, adapted to
  - recognize a plurality of context descriptions and to adapt the smart sensors sensing of data from an associated semiconductor manufacturing device responsive to the context descriptions;
  - receive from the controller a current context of operation of the semiconductor manufacturing device associated with the smart sensor; and
  - transmit to the controller data sensed by the smart sensor, responsive to the received current context.

49. The device of claim 48, wherein the smart sensor includes a simple sensor and a smart adapter, wherein the smart adapter includes the logic and resources adapted to recognize a plurality of context descriptions and to adapt the incumbent sensors sensing of data from an associated semiconductor manufacturing device responsive to the context descriptions.

50. The method of claim 49, wherein the simple sensor is an incumbent sensor being adapted to respond to the current context received from the controller.

* * * * *